May 29, 1951    J. BRISKIN    2,554,892
FILM DRIVING MECHANISM FOR OPTICAL COMPENSATING
MOTION-PICTURE APPARATUS
Filed Nov. 14, 1946    7 Sheets-Sheet 1

INVENTOR.
Jack Briskin
BY
Zabel & Fitzbaugh
Attorneys

May 29, 1951 J. BRISKIN 2,554,892
FILM DRIVING MECHANISM FOR OPTICAL COMPENSATING
MOTION-PICTURE APPARATUS
Filed Nov. 14, 1946 7 Sheets-Sheet 3

INVENTOR.
Jack Briskin
BY
Zabel & Gritzbaugh
Attorneys

May 29, 1951

J. BRISKIN 2,554,892

FILM DRIVING MECHANISM FOR OPTICAL COMPENSATING
MOTION-PICTURE APPARATUS

Filed Nov. 14, 1946

INVENTOR.
Jack Briskin
BY
Zabel & Gritzbaugh
Attorneys

INVENTOR.
Jack Briskin
BY
Zabel & Fritzbaugh
Attorneys

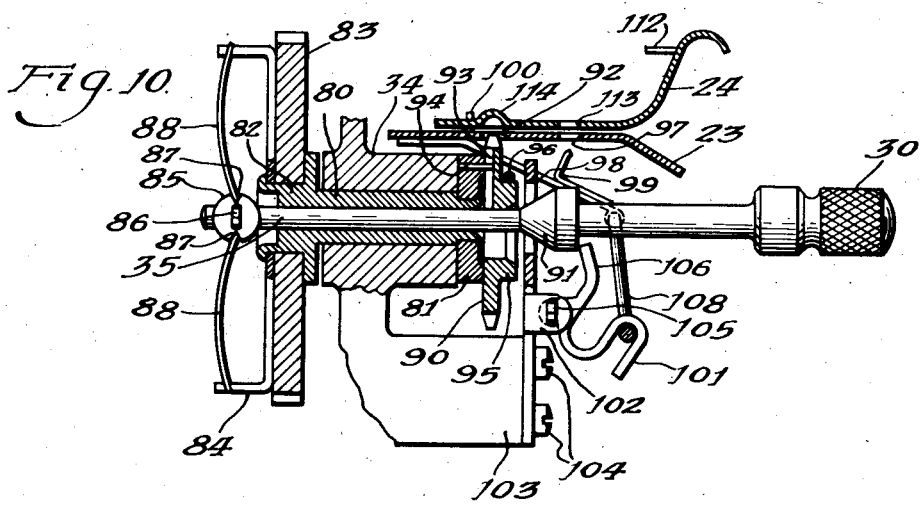
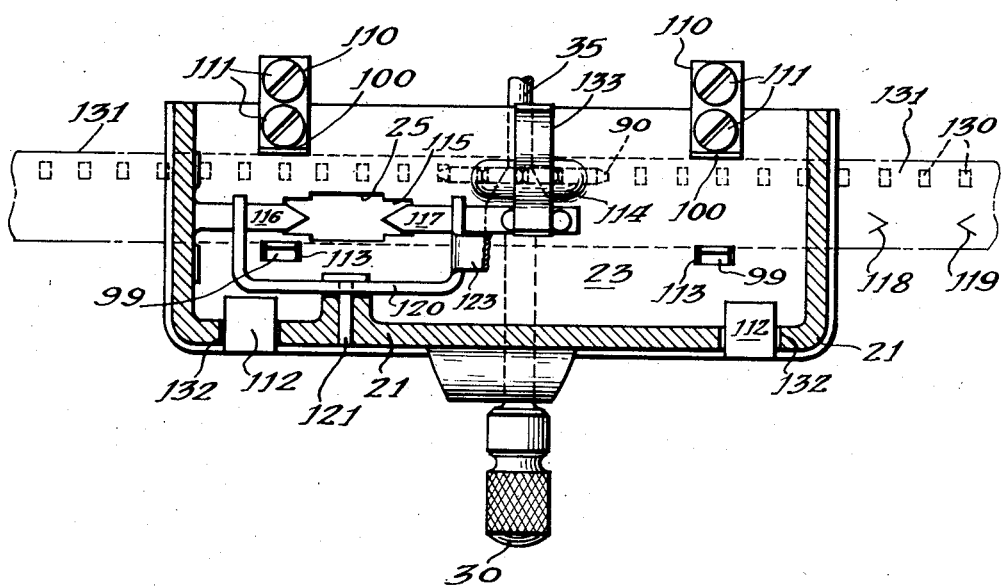

Patented May 29, 1951

2,554,892

UNITED STATES PATENT OFFICE 2,554,892

FILM DRIVING MECHANISM FOR OPTICAL COMPENSATING MOTION-PICTURE APPARATUS

Jack Briskin, Chicago, Ill., assignor to Revere Camera Company, Chicago, Ill., a corporation of Delaware Application November 14, 1946, Serial No. 709,727

5 Claims. (Cl. 88—16.8)

1

This invention relates to improvements in motion picture apparatus, and in particular, to an improved film viewer, although certain aspects of the invention are equally applicable to other types of motion picture apparatus.

In making motion pictures, after the developed film has been received, the operator often desires to inspect or view the film in order that certain damaged frames may be cut out, or in order to get an idea of the sequence of the scenes for later editing, which involves cutting out certain scenes and shifting their sequence. A device for viewing the film is called a film viewer. A film viewer generally provides means for projecting the image of the film on a small ground glass screen which forms a part of the viewer, the projected image being sufficiently large so that the operator can see the same. Film viewers also generally incorporate an optical compensator so that the moving picture effect will be evidenced as the film is pulled through the viewer, the operation of the optical compensator permitting continuous movement of the film, as contrasted with the intermittent movement which is provided in the usual projector.

An object of my invention is to provide an improved film viewer which embodies means both to view the film, and also for indicating on the film itself those frames or groups of frames which are to be removed or cut out at a later time. In this connection, I have provided means for making two different types of indication on the film so that the operator can readily distinguish between those portions which are to be cut out, and those portions which are to be retained. Furthermore, the indications are in the form of a cut or break in the film, which may readily be sensed tactilly as the operator draws the film through his fingers, or visually.

Another object of my invention is to provide means by which a film can be easily inserted and removed from the viewer without the necessity of threading the film through the viewer, or through that portion thereof which is referred to hereinafter as the "film gate." In this connection, I have provided an improved film gate which embodies a retractible film guiding means and a retractible sprocket or driving means.

A further object is to provide indicating or notching means mounted on the film gate itself, to the end that the indication or notch may be made on the film adjacent the frame which is desired to be removed, and to the end that this may be done while the image of said frame is being projected on the screen.

2

A further object of this invention is to provide a film viewer which can alternatively be used as a projector. That is, the image on the film can be projected either on the glass screen of the viewer, in which event it is visible primarily to the operator of the viewer, or alternatively it can be projected on a more remote screen in the usual fashion, so that several people can readily see the image.

Other objects, features and advantages will become apparent as the description proceeds.

With reference now to the drawings, in which like reference numerals designate like parts, Fig. 1 is a front elevation of a preferred embodiment of my invention, certain underlying parts being shown in broken lines;

Fig. 10 is a view similar to Fig. 7, but showing the parts in a changed position; and Fig. 11 is a horizontal detail view taken along line 11—11 of Fig. 1.

Figure 1:
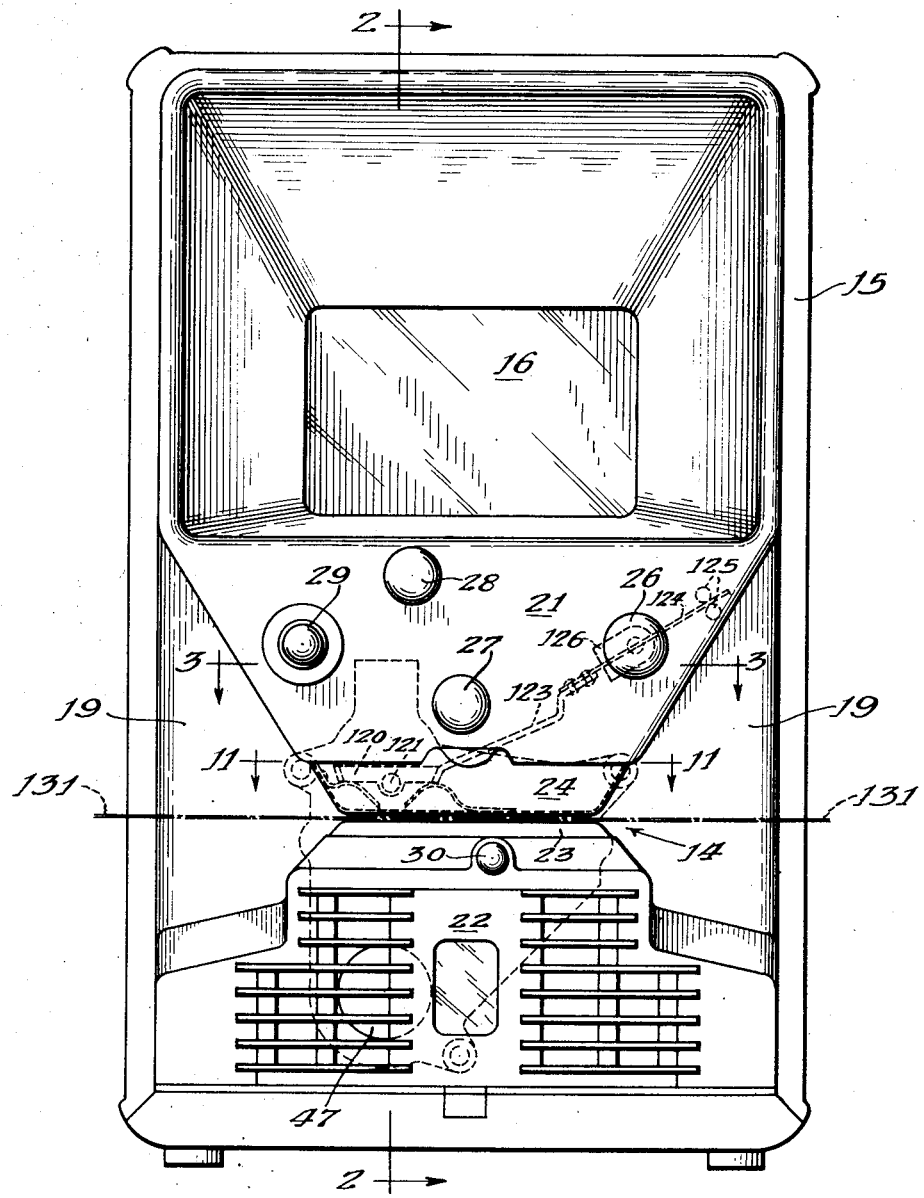
Figure 2:
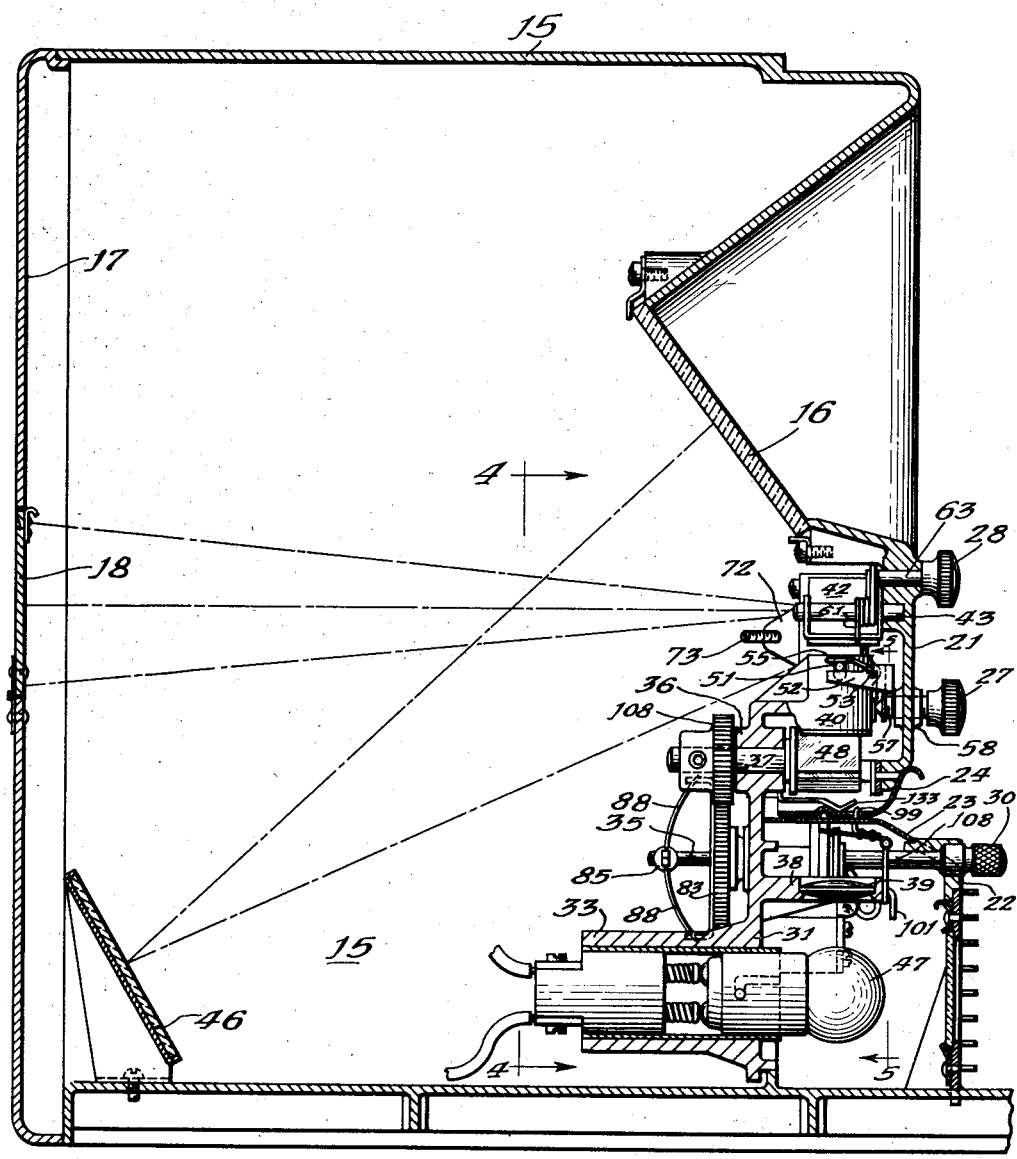
Fig. 2 is a vertical section taken along line 2—2 of Fig. 1.

With reference now to Figs. 1 and 2, the film viewer comprises a housing 15, in the front portion of which is disposed a ground glass screen 16 upon which the image may be projected. A removable back 17 is provided for the housing 15, which affords access to the parts. A door 18 is provided in the removable back which may be opened when it is desired to project an enlarged image on a more remotely disposed screen, as will be pointed out hereinafter in greater detail.

The side walls of the housing are tapered forwardly as shown in Fig. 1, to provide reentrant portions 19 which permit the film to be fed through that portion of the viewer which, for lack of a better term, is hereinafter referred to as the film gate 14. The portion of the front wall of the housing which is disposed above the film gate is referred to as the upper front wall portion 21, and that portion which is below, is referred to as the lower front wall portion 22. The film gate itself comprises a lower gate member 23, and an upper gate member 24, the latter being removable.

As shown in Fig. 11, suitable apertures 25 are provided in the upper and lower gate members through which a light beam may be projected.

Projecting from the upper front wall portion 21 are a plurality of control elements which include a knob 26 for notching the film, a knob 27 for adjusting the focus of the projection lens 41, a knob 28 for shifting the projected beam from the screen 16 to a more remotely disposed screen, or vice versa, and a knob 29 which controls a light switch.

Projecting from the lower front wall portion 22 is a knob 30 for operating the compensator and shifting the position of the film in synchronism therewith, and also for opening the film gate to permit insertion of or removal of the film.

Figure 3:
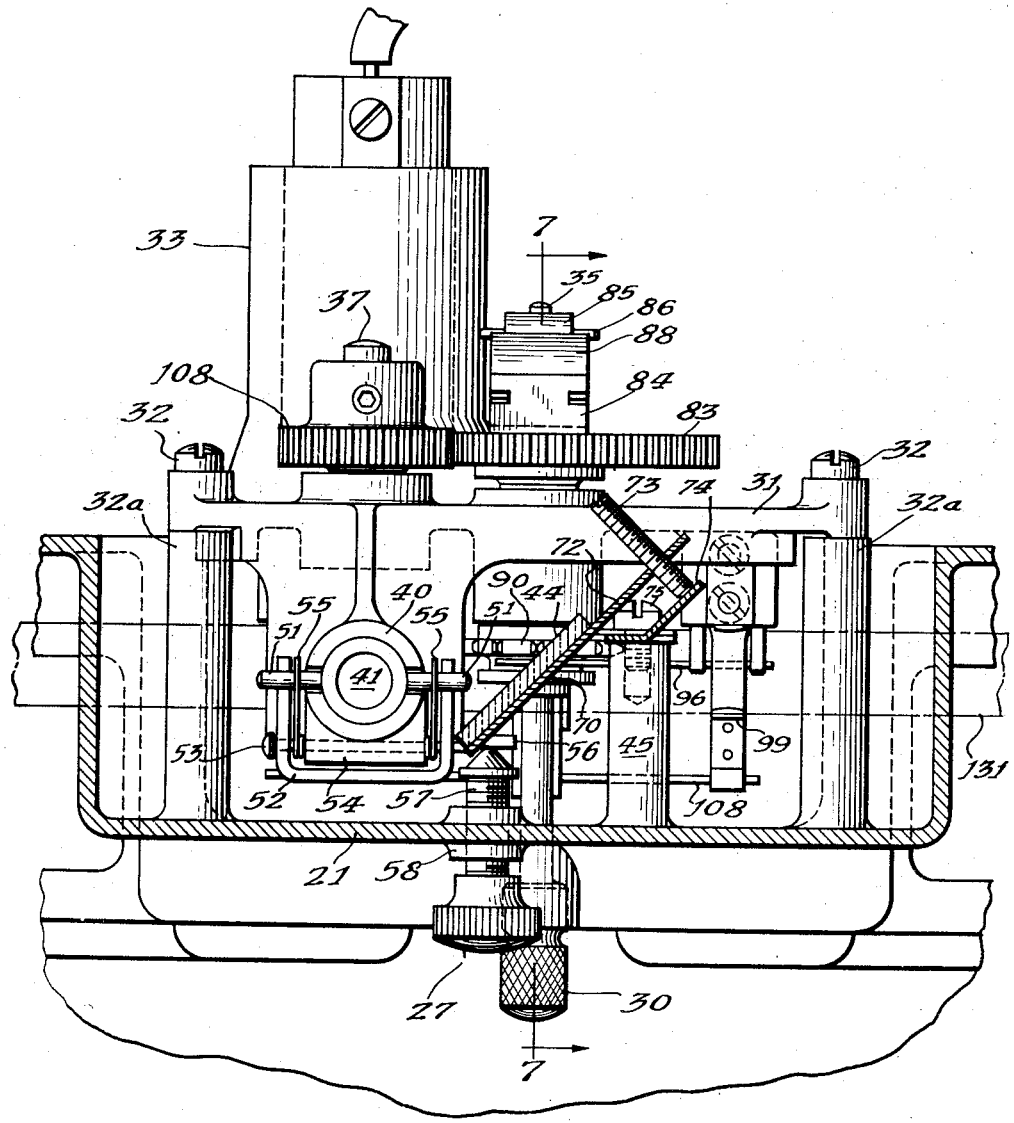
Fig. 3 is an enlarged horizontal section taken along line 3—3 of Fig. 1.
Figure 4:
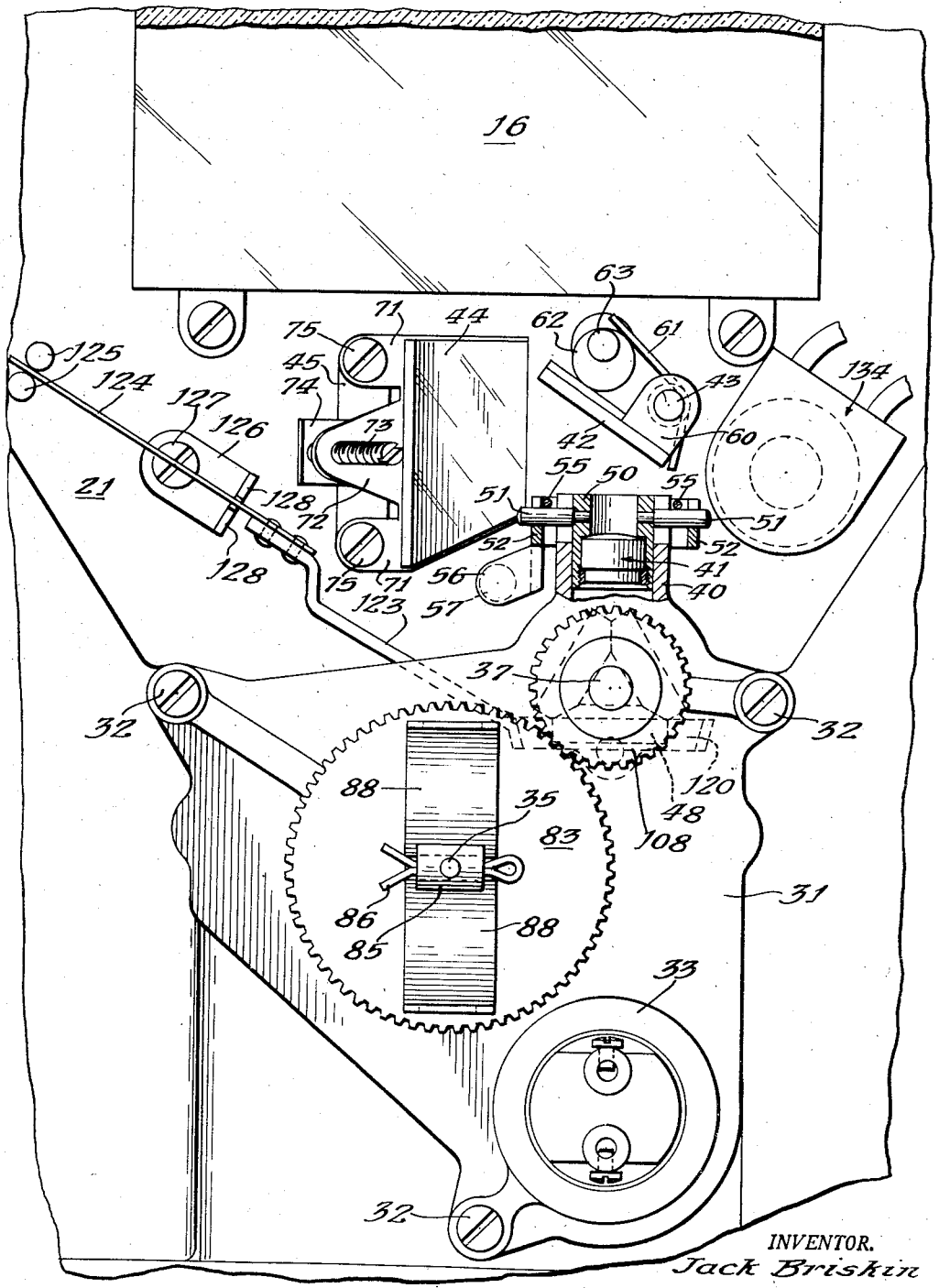
Fig. 4 is an enlarged vertical section taken along line 4—4 of Fig. 2.
Figure 5:
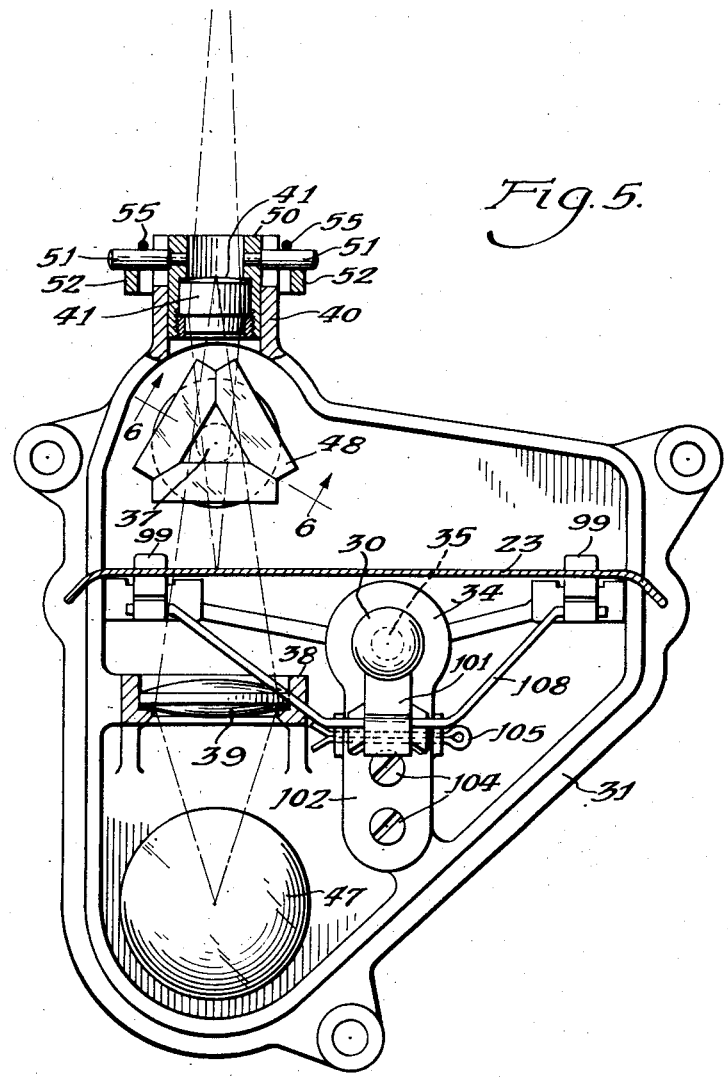
Fig. 5 is an enlarged vertical view, partially in section, along line 5—5 of Fig. 2.

A number of operating parts are mounted on a casting 31 shown in Figs. 2, 4 and 5. The casting is mounted with respect to the upper and lower front wall portions by means of screws 32, which take into pillars 32a, shown in Fig. 3. Carried by the casting 31 is a light socket 33, a bearing 34 for the shaft 35 of knob 30, and a bearing 36 for the shaft 37 of the compensator 48. The casting 31 also provides a seat 38 for the condensing means 39, and a sleeve 40 for an adjustably mounted projection lens 41.

In addition to the condensing lens 39, the compensator 48, and the projection lens 41, the optical system comprises a mirror 42 pivotally mounted on a pin 43 which projects rearwardly from the upper front wall portion 21, a mirror 44 mounted on pillars 45 which also project rearwardly from the upper wall portion 21, a mirror 46 located in the lower rear portion of the housing 15, and the screen 16.

In operation, a light source 47 is received in the light socket 33, and illuminates that portion of a film which is disposed between the lower and upper gate members 23 and 24, at the point between the registering apertures 25. The condensing lens 39 serves to concentrate this light beam in the usual manner. The image on the film is projected through the projection lens 41, as shown in Fig. 3, and is then reflected by mirrors 42 and 44 as shown in Fig. 4, and by mirror 46 as shown in Fig. 2, so that the image is projected on the ground glass screen 16. The arrangement of the mirrors 42 and 44 serves to twist the light beam through 90 degrees so that the image as projected on the glass screen 16 is in its natural position, even though the image on the film is oriented in a different direction.

In order to focus the image, the projection lens 41 is mounted in a lens holder 50 which slides within the sleeve 40. Diametrically opposed pins 51 extend outwardly from the lens holder and are engaged by the two arms of a yoke 52. The yoke is mounted on a pivot pin 53, as shown in Fig. 3, the pin in turn being mounted in a projecting portion 54 of the sleeve 40. Springs 55 engage the pins 51 and urge them downwardly against the arms of the yoke. A plate 56 projects from one of the yoke arms and is engaged by a screw 57 on which the knob 27 is mounted, the screw being threaded into bushing 58 in the upper wall portion 21. In operation, it will be seen that when the knob 27 is screwed inwardly, the yoke 52 will be tilted, thereby raising the projection lens, and vice versa.

In order to project the light beam through the door 18, the position of mirror 42 is shifted upwardly with the result that the light beam is projected from mirror 44 in a horizontal direction and rearwardly through the door 18, instead of being projected downwardly and rearwardly so that the light beam is reflected from mirror 46 on to the ground glass screen 16. The mirror 42 is mounted on a bracket 60 which includes a backing plate, as well as bent over ears which are pivoted on the pin 43. A spring 61 urges the bracket and mirror in a clockwise direction, as viewed in Fig. 4, and into engagement with a cam 62 which is suitably secured to the shaft 63 of the knob 28. Fig. 4 shows the mirror 42 in its down position in which the image will be projected on the ground glass screen 16. By rotating the knob 28 through 180 degrees, more or less, the spring 61 will cause the mirror to be rotated in a clockwise direction so that the projected light beam will be substantially horizontal.

The mirror 44 is mounted on a backing plate 70, the backing plate having bent ears 71 which are secured to pillars 45 by means of screws 75. As shown in Figs. 3 and 4, the backing plate includes a tongue 72 intermediately disposed with respect to the bent ears 71. A set screw 73 is threaded through the tongue 72, and at its end engages a plate 74 which is also mounted on pillars 45. Thus by tightening up the set screw 73, the angle of mirror 44 may be adjusted so that the projected image will be centered with respect to the ground glass screen 16, and also with respect to the door 18.

Figure 6:
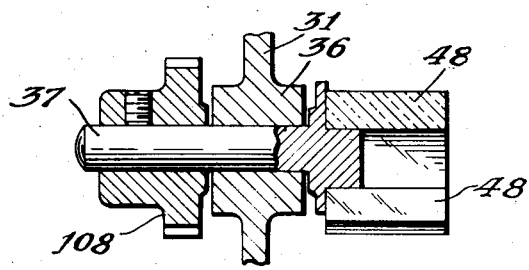
Fig. 6 is a detail section taken along line 6—6 of Fig. 5.

The compensator 48 comprises three parallel surface refracting elements arranged in the form of an equilateral triangle, as indicated in Figs. 5 and 6. The operation of the compensator is described more fully in copending application Serial No. 583,423, filed March 19, 1945, now Patent No. 2,463,016 dated March 1, 1949. In operation the compensator must be rotated in synchronism with the movement of the film, and in this connection means are provided to achieve such synchronism.

Figure 7:
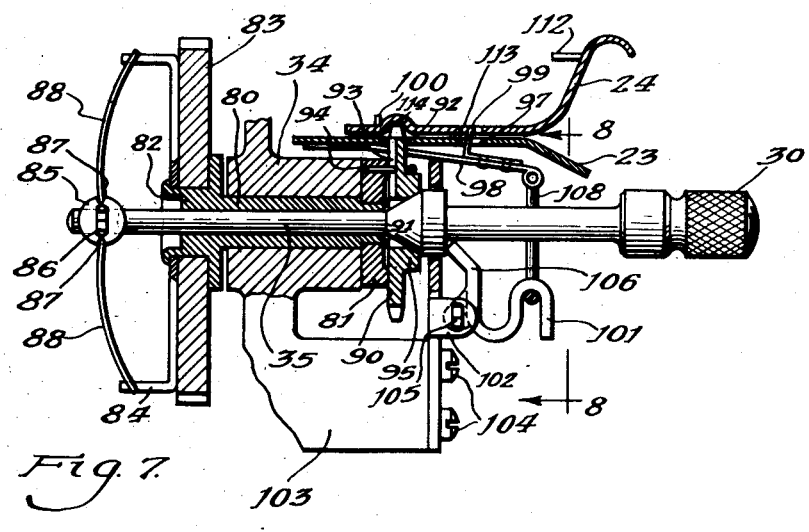
Fig. 7 is an enlarged detail section taken along line 7—7 of Fig. 3.
Figure 8:
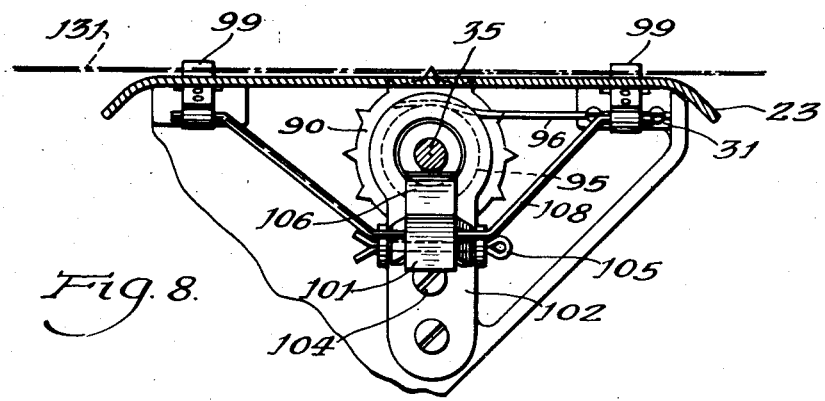
Fig. 8 is a section taken along line 8—8 of Fig. 7.

With reference to Figs. 7 and 10, the shaft 35 has keyed to it a sleeve 80, but the parts are free for relative axial movement. The sleeve 80 is formed with a disk or hub 81 at its front end, and with a hub 82 at its rear end, the sleeve being journaled in bearing 34, and the hubs serving to prevent any substantial axial movement of the sleeve with respect to the bearing. A gear 83 is mounted on the hub 82, and engages a pinion 108 which is secured to the compensator shaft 37. Thus, by rotating the compensator shaft 37, either by means of knob 30 or otherwise, the compensator 48 will be driven.

Secured to the gear 83 is a U-shaped plate 84 shown in Figs. 7 and 4. A sleeve shaped element 85, which is set with its axis perpendicular to the axis of shaft 35, and is secured thereto by a cotter pin 86, is provided with diametrically opposed notches 87. Spring strips 88 are maintained under compression, and slightly bowed, between notches 87 and suitable slots in the arms of the U-shaped plate 84. Thus, the spring strips 88 provide an overcenter action by means of which the shaft 35 may be maintained in either one of two longitudinal positions, with respect to the sleeve 80.

A film sprocket 90 having a hub 95 is loosely seated on a cone 91 which forms a portion of the shaft 35. The sprocket is provided with a slot 93 into which projects a pin 94 which is mounted on the hub 81. The sprocket 90 normally projects through a slot 92 in the lower gate member 23, and is adapted to engage the apertures 130 in film strip 131, as shown in Fig. 11. Thus, as the film is pulled through the film gate, the sprocket 90 will be driven, and also the gear 83, the pinion 108, and the compensator 48.

In order to remove the film from the film gate laterally, that is, to the right as viewed in Figs. 7 and 10, it is necessary to cause the sprocket 90 to drop below the surface of the lower gate member, in order to become disengaged from the apertures 130. This dropping of the sprocket is caused by shifting the knob 30 and the shaft 35 to the right, as shown in Figs. 7 and 10, that is from the position of Fig. 7 into the Fig. 10 position. Thus, the cone 91 is withdrawn from the hub 95 of the film sprocket, with the result that the sprocket is free to drop downwardly as shown in Fig. 10. A spring 96, one end of which is suitably anchored in a portion of the casting 31, engages the hub 95 and assists in forcing the sprocket downwardly. The coupling between the film sprocket and the sleeve 80 which is provided by the pin and slot arrangement prevents any shifting of the angular position of the sprocket with respect to the sleeve, with the result that when the film is engaged by the sprocket, the angular position of the compensator will always be synchronized with respect to the frame which is disposed between the apertures 25.

Means are also provided to lock the film in the film gate. A pair of apertures 97 is provided in the lower gate member 23. Underlying each aperture is a resilient strip 98 which has a lug 99 which is adapted to project through the aperture 97 when the parts are in the Fig. 7 position, in order to confine the film between the lugs 99 and lugs 100 which are struck up from the lower gate member 23.

An S-shaped strip 101 is mounted on a bracket 102 by means of a cotter pin 105. The bracket is secured to a portion 103 of the casting 31 by means of screws 104. The bracket includes forwardly bent ears through which the cotter pin extends, and also an upwardly extending apertured portion through which the cone 91 extends, this portion of the bracket also serving to prevent axial displacement of the sprocket 90 to such an extent that the pin 94 will become disengaged from the slot 93. The end 106 of the S-strip 101 is engaged by the cone 91 so that when the knob 30 is pulled outwardly, the S-strip will be rocked downwardly, as shown in Fig. 10. A yoke shaped link 108 connects the S-strip with the forward ends of the resilient strips 98 so that when the S-strip is rocked downwardly, the resilient strips will be flexed downwardly, thereby withdrawing the lugs 99 from the apertures 97, and thus permitting the lateral removal of the film. The resilience of the strips 98 tends to keep them normally in the Fig. 7 position, but on the other hand, their resilience exerts less effect on the position of the shaft 35 than does the resilience of the spring strips 88, with the result that they do not interfere with the over-center action provided by the latter strips.

Thus, it will be seen that by pulling out the knob 30, both the film sprocket 90 and the lugs 99 will be caused to drop beneath the surface of the lower gate member, thereby releasing the film 131. Although the normal operation of the device contemplates the driving of the compensator by the exertion of a steady pull on the film, causing it to move through the film gate at a uniform rate of speed, it is obvious that in locating a particular frame which may be damaged, it may be easier to control the position of the film by rotating the knob 30, and of course this also causes a corresponding shift in the angular position of the compensator, since the shaft 35 is keyed to the sleeve 80.

The rear edge of the lower gate member 23 is secured to a suitable portion of the casting 31 by means of blocks 110 and screws 111, as shown in Fig. 11. The front edge of the member 23 rests on the upper edge of the lower wall portion 22, as shown in Fig. 1.

Figure 9:
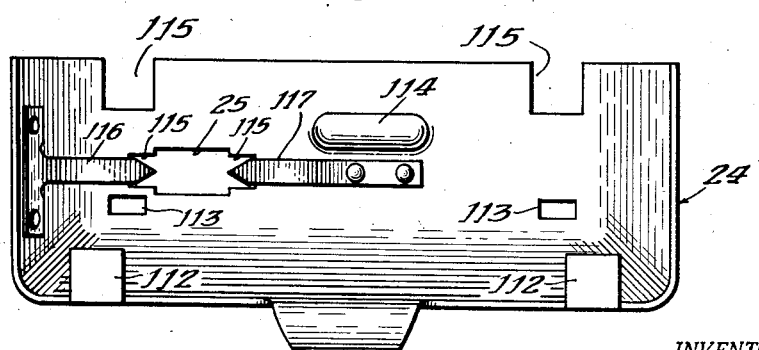
Fig. 9 is a plan view of the removable upper gate member.

The upper gate member 24 is removably mounted so as to provide access to certain of the parts. This member is shown in Figs. 9 and 11. It comprises a shell or stamped sheet metal member provided with tongues 112 which are received in suitable slots 132 formed in the upper wall portion 21. The upper gate member is also provided with apertures 113 which register with apertures 97, and through which the lugs 99 may be projected. It is also provided with an embossing 114 which provides clearance for the sprocket 90, the embossing being disposed above the slot 92 in the lower gate member 23. The upper gate member 24 is maintained in its operative position by means of a suitable leaf spring 133, which engages the embossing 114, as shown in Fig. 2.

The apertures 25, formed in both the lower and upper gate members and through which the light beam is projected, have laterally extending portions 115 to permit the notching of the film in the desired position. Spring strips 116 and 117 are suitably riveted to the upper surface of the upper gate member 24, and are provided with pointed ends which overlie the portions 115 of the apertures 25. Thus, as one or the other of the spring strips is depressed, it will form notches 118 or 119, respectively, in the film 131, these notches being shown in Fig. 11.

Means are provided for actuating one or the other of the spring strips 116 and 117, alternatively. This means comprises a yoke member 120 which is pivoted on a pin 121 projecting rearwardly from the upper wall portion 21, as shown in Fig. 2, the yoke being arranged so that one arm engages the spring strip 116, and the other arm engages the spring strip 117, as shown in Figs. 1 and 11. A projection 123 extends laterally and upwardly from the yoke, and at its outer end has riveted to it, a resilient strip 124, as shown in Figs. 1 and 4. The outer end of the resilient strip is positioned between a pair of pins 125 which project rearwardly from the upper wall portion 21. Thus, the yoke tends to be maintained in its neutral position wherein neither one of the spring strips 116 and 117 are depressed, but the resilient strip 124 permits the yoke to be rocked in either direction. A rock plate 126 is suitably secured to the knob 26 by a screw 127 which extends through the upper wall portion 21, the rock plate and the knob being on opposite sides of the wall. The rock plate is provided with forked ends 128 which embrace the resilient strip 124, so that by rocking the knob 26 in the clockwise direction, as shown in Fig. 1, the spring strip 116 is depressed to make a notch in the film corresponding to notch 118; whereas, when rocked in the counterclockwise direction, the spring strip 117 will be depressed to make a notch corresponding to 119.

Thus, if when viewing the film, a single damaged frame is found which it is desired to remove, this frame is brought into position between the apertures 25 so that it is projected on to the ground glass screen 16. Then, by rotating the knob 26 first in one direction, and then in the other, notches will be made on the film at both sides of the damaged frame, to indicate that it should be removed. However, if a whole scene is to be removed, the knob is rotated first in the clockwise direction to make a notch 118 at the beginning of the scene, and then the film is pulled through to the end of the scene, at which time the knob 26 is rotated in the counterclockwise direction to make a notch 119. Thus, by providing two types of notches, one indicates the beginning of the portion of the film to be removed, and the other indicates the end of that portion. The arrow shape of the notches also facilitates the understanding of this arrangement.

The operation of the parts has been described in detail with respect to each individual group of elements. When the viewer is to be used, the knob 29 is turned to turn on the lamp 47, the knob 29 actuating a light switch 134. The knob 30 is pulled out to open the film gate, and the film inserted. Then by pushing the knob 30 partially in so as to raise the film sprocket 90, just a little above the surface of the lower gate member, and by shifting the film lengthwise, registration of the sprocket and the apertures 130 can be effected. Then the knob 30 is pushed all the way in, which locks the film gate. Then, the film is continuously pulled through the film gate which results in the projection of the moving picture upon the ground glass 16. In case it is desired to use the viewer as a projector the door 18 is opened, the beam shifting knob 28 is rotated until the beam is projected through the door and then the necessary focus adjustment is made by knob 27.

For ordinary viewing or inspecting, however, the image is projected on the ground glass screen 16, and individual frames, or a whole series, which it is desired to remove, may be marked by actuating the knob 26 as above pointed out. By virtue of the fact that the notching elements are disposed immediately adjacent the apertures 25, through which the light beam is projected, the notches may be made immediately adjacent the damaged frame. To remove the film, the knob 30 is first pulled out, and then the film will slide right out of the film gate.

The improved film gate construction and the displaceable sprocket which are described herein are of utility in other types of motion picture apparatus, such as cameras and projectors, in which it may be desired to avoid the usual film gate construction which requires a more inconvenient threading operation. With respect to this aspect of the invention, the reference herein to film viewers is merely illustrative of the type of apparatus in which my invention is of utility.

It will be understood that various modifications and changes may be made without departing from the spirit of my invention as defined by the appended claims.

I claim:

1. Motion picture apparatus comprising a film gate through which a perforated film may be drawn, a sprocket normally projecting into said film gate and engaging the apertures of said film, an axially displaceable shaft on which said sprocket is mounted for radial displacement, and cooperating means on said shaft and said sprocket for centering said sprocket with respect to said shaft when said shaft is in its normal position, whereby axial displacement of said shaft from said normal position to cause disengagement of said cooperative means will permit said sprocket to be displaced downwardly in a radial direction so as to cause the sprocket to become disengaged from said film, an element rotatably mounted on said shaft and having a surface disposed adjacent said sprocket, and a coupling between said rotatable element and said sprocket, said coupling comprising a pin projecting from the adjacent surface of one of said coupled elements, the other one of said coupled elements being formed with a radially disposed groove for receiving said pin.

2. Motion picture apparatus comprising a film gate through which a perforated film may be drawn, a sprocket normally projecting into said film gate and engaging the apertures of said film, means to displace said sprocket in a radial direction so as to cause the sprocket to become disengaged from said film, said means comprising an axially displaceable shaft having an enlarged portion of conical shape, said sprocket being provided with a hub having a conically shaped center opening of a diameter substantially greater than the diameter of said shaft, and adapted to be engaged by said enlarged portion to maintain said sprocket in a normal position in which it is concentric with said shaft, whereby axial displacement of said shaft to cause disengagement of said enlarged portion with said central opening will permit said sprocket to be radially displaced, and resilient means engaging said hub to effect such radial displacement, said sprocket being formed with a radial slot, a disk rotatably mounted on said shaft and disposed adjacent said sprocket and a pin extending from said disk into said radial slot to provide driving connection between said sprocket and said disk, whereby the angular correspondence between said disk and said sprocket may be maintained irrespective of the displacement of said sprocket.

3. A film viewer comprising a film gate through which a perforated film may be drawn, a sprocket normally projecting into said film gate and engaging the apertures of said film, an axially displaceable shaft on which said sprocket is mounted for radial displacement, and cooperating means on said shaft and said sprocket for centering said sprocket with respect to said shaft when said shaft is in its normal position, whereby axial displacement of said shaft from said normal position to cause disengagement of said cooperative means will permit said sprocket to be displaced downwardly in a radial direction so as to cause the sprocket to become disengaged from said film, a rotatably mounted optical compensator, an intermediate rotatable element normally axially aligned with said sprocket and in driving engagement with said rotatable compensator, and a coupling between said intermediate element and said sprocket for maintaining angular correspondence between said intermediate element and said sprocket irrespective of the radial displacement of the latter.

4. Motion picture apparatus comprising a film gate through which a perforated film may be drawn, a sprocket normally projecting into said film gate and engaging the apertures of said film but adapted to be displaced downwardly in a radial direction so as to become disengaged from said film, an axially displaceable shaft having an enlarged portion of conical shape, said sprocket being provided with a hub having an enlarged central opening, and overcenter means operatively associated with said shaft to maintain the same in either one of two limiting positions, in one of which positions said enlarged portion engages said enlarged central opening to maintain said sprocket in normal concentric position, and in the other of which positions said shaft is axially displaced so that said enlarged portion does not engage said conically shaped central opening, thereby permitting said sprocket to drop downwardly.

5. A film viewer comprising a film gate through which a perforated film may be drawn, a sprocket normally projecting into said film gate and engaging the apertures of said film but adapted to be displaced downwardly in a radial direction so as to become disengaged from said film, an axially displaceable shaft having an enlarged portion of conical shape, said sprocket being provided with a hub having an enlarged central opening, overcenter means operatively associated with said shaft to maintain the same in either one of two limiting positions, in one of which positions said enlarged portion engages said enlarged central opening to maintain said sprocket in normal concentric position, and in the other of which positions said shaft is axially displaced so that said enlarged portion does not engage said conically shaped central opening, thereby permitting said sprocket to drop downwardly, said sprocket being formed with a radial slot, a disk rotatably mounted on said shaft and disposed adjacent said sprocket, a pin extending from said disk into said radial slot to provide a driving connection between said sprocket and said disk, a gear associated with said disk and adapted to be driven thereby, and an optical compensator spaced from said film gate and adapted to be driven by said gear whereby a predetermined correspondence is always maintained between the angular position of said sprocket and the angular position of said optical compensator.

JACK BRISKIN.

REFERENCES CITED

The following references are of record in the file of this patent:

UNITED STATES PATENTS

| Number | Name | Date |
|---|---|---|
| 1,232,418 | Akeley | July 3, 1917 |
| 1,579,805 | Ball et al. | Apr. 6, 1926 |
| 1,637,378 | Howell | Aug. 2, 1927 |
| 1,910,995 | Leventhal | May 23, 1933 |
| 2,211,218 | Serrurier | Aug. 13, 1940 |
| 2,422,816 | Baia | June 24, 1947 |